March 20, 1934.  K. JANISZEWSKI  1,951,869
WORK HOLDING DEVICE
Filed May 12, 1930  2 Sheets-Sheet 1
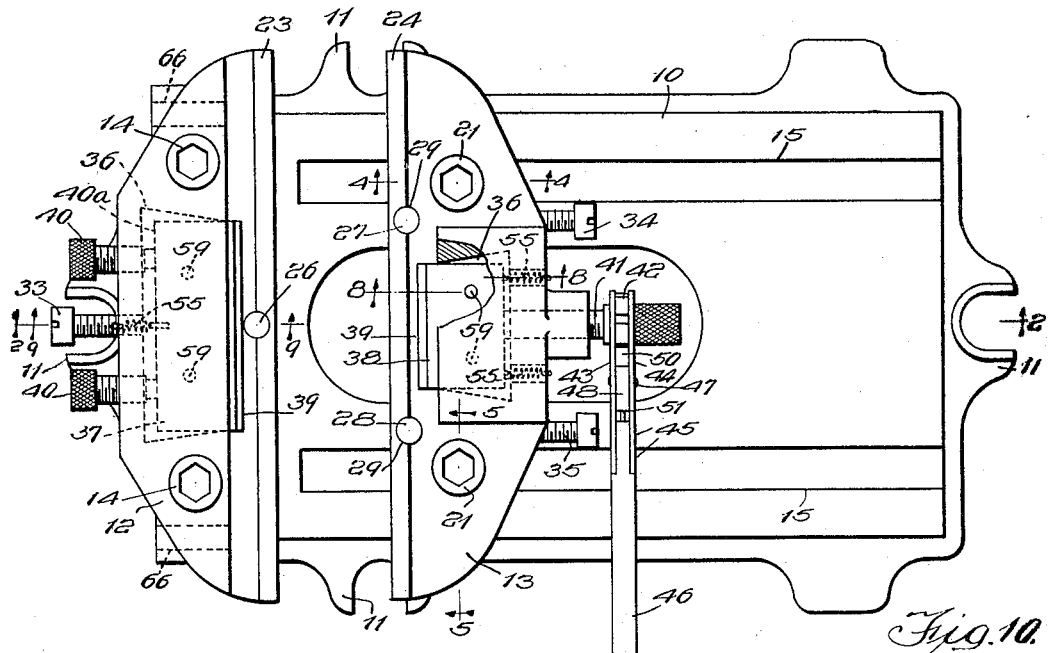
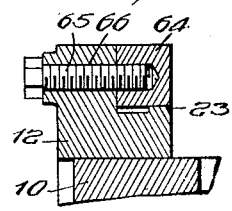
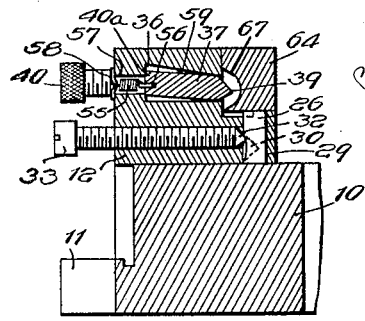
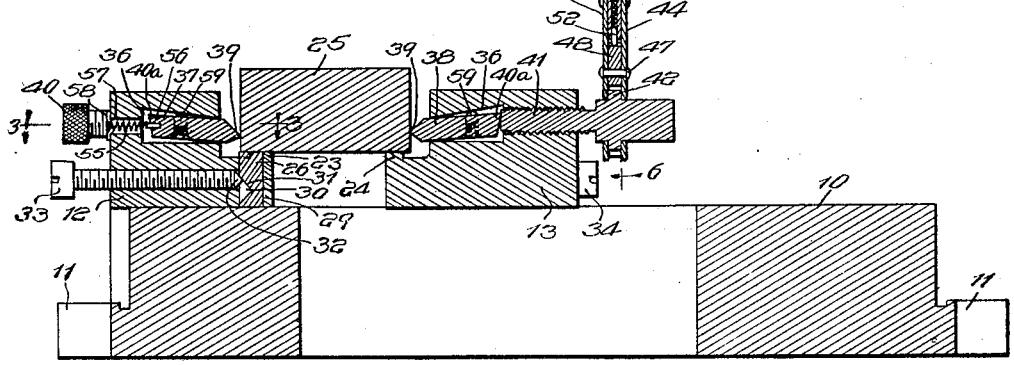
Witness:
William P. Kilroy
Inventor:
Kasimir Janiszewski
By Hill & Hill
Attys.

March 20, 1934.  K. JANISZEWSKI  1,951,869
WORK HOLDING DEVICE
Filed May 12, 1930  2 Sheets-Sheet 2
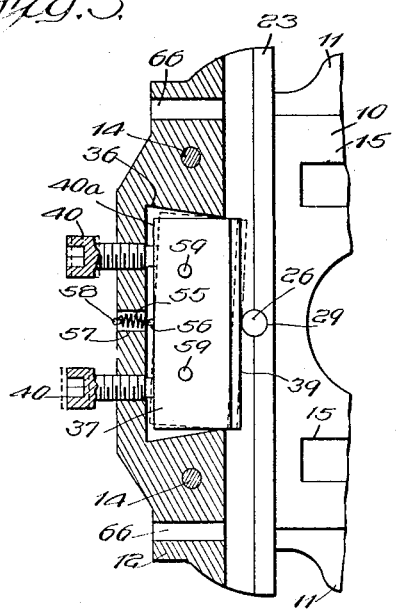
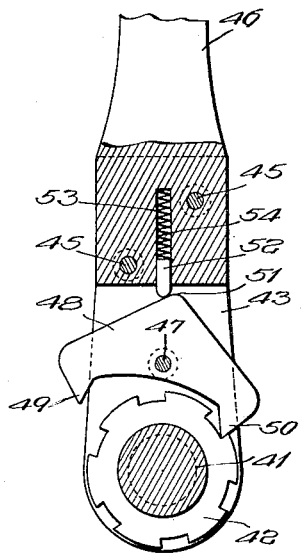
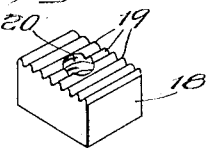
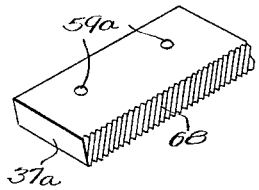
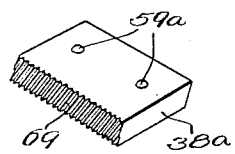
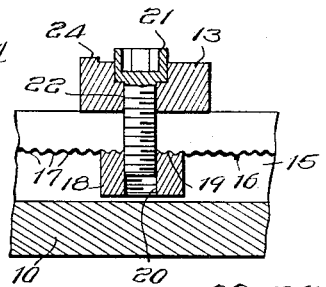
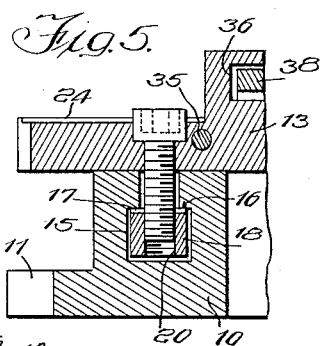
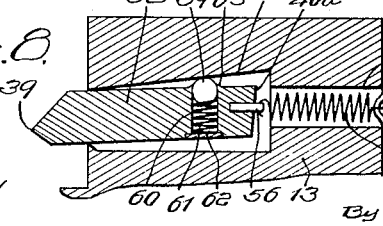
Inventor
Kasimir Janisjewski
Hill & Hill
By
Attys
Witness:
William P. Kilroy Patented Mar. 20, 1934

1,951,869

UNITED STATES PATENT OFFICE 1,951,869

WORK HOLDING DEVICE

Kasimir Janiszewski, Milwaukee, Wis., assignor to Superior Tool and Die Company, Milwaukee, Wis., a corporation of Wisconsin Application May 12, 1930, Serial No. 451,629

4 Claims. (Cl. 90—60)

The invention relates to work holding devices, and particularly to a device which may be used for holding a piece of work on milling machines, planers, or other machines of a type wherein it is desirable to hold or secure the work in predetermined position while it is being operated upon.

One object of the present invention is to provide novel means for securing the work-engaging members against accidental displacement when in work engaging position, and wherein any tendency of the work to become disengaged from the holder causes the work engaging devices to more tightly engage the work for retaining it in desired position.

Another object of the invention is to provide novel means for positioning the work vertically as desired, and with respect to the plane of movement of a tool employed in the operation of the machine in connection with which the tool holder may be used.

Another object of the invention is to provide means for angularly positioning the work with respect to the work holder, and with respect to the movement of the tool employed in the operation of the machine on which the holder is mounted.

Another object of the invention is to provide a construction and arrangement of the work engaging and the adjusting means therefor, whereby any tendency of the work to lift from its support serves to cause the work engaging edge of the holding members to more tightly impinge the work.

Another object of the invention is to provide resilient means for moving the work-engaging members away from the work.

Another object of the invention is to provide means whereby the work-engaging members may be readily and quickly positioned into and out of engagement with the work.

Another object of the invention is to provide a filler block construction adapted to be employed in conjunction with the work holding members of the device.

A further object of the invention is to provide a novel form of work-engaging jaws to be employed with the device.

A still further object of the invention is to improve devices of the character described in sundry details hereinafter referred to and particularly pointed out in the appended claims.

One embodiment of the present invention is shown for illustrative purposes in the accompanying drawings, in which Fig. 1 is a plan view of a device illustrating certain novel features of the invention, and showing a base adapted to be secured to the bed plate of a machine in connection with which the device is to be used;

Fig. 2 is a longitudinal sectional elevation taken substantially as indicated by the line 2—2 of Fig. 1, and illustrating the manner of securing a piece of work in the holder;

Fig. 3 is a fragmentary plan view, partly in section, taken substantially as indicated by the line 3—3 of Fig. 2, and illustrating in dotted lines, the manner of angularly adjusting one of the work-engaging members with respect to the device;

Fig. 4 is a fragmentary sectional elevation taken substantially as indicated by the line 4—4 of Fig. 1;

Fig. 5 is a fragmentary sectional elevation taken substantially as indicated by the line 5—5 of Fig. 1;

Fig. 6 is an enlarged sectional elevational view taken on the line 6—6 of Fig. 2, and illustrating a reversible ratchet mechanism employed in actuating the adjusting means associated with one of the work engaging members;

Fig. 7 is a perspective view of one of the blocks employed in securing one of the corners to the base of the device;

Fig. 8 is an enlarged sectional view taken substantially as indicated by the line 8—8 of Fig. 1, and illustrating the manner of mounting the work-engaging members in the device;

Fig. 9 is a fragmentary sectional elevational view taken substantially as indicated by the line 9—9 of Fig. 1, and illustrating the application of a filler block to the device and the manner of positioning the work vertically with respect to the holder;

Fig. 10 is a fragmentary sectional view illustrating the manner of securing the filler block to one of the carriers of the device; and Fig. 11 is a view of a pair of cooperating work-engaging members having a modified form of work contacting surfaces formed on one of their edge portions.

As shown in the drawings, the illustrative embodiments of the invention comprise a base 10 provided with notched or recessed ears 11 for securing the base to a machine, such as a planer, or the like, (not shown).

Mounted upon the base are a plurality of carriers 12 and 13, the carrier 12, in the present instance, being rigidly secured to the base by means of bolts 14, and the carrier 13 being movably mounted on the base in a manner to be secured in various positions of adjustment with respect to the carrier 12, depending upon the dimensions of the work to be secured in the holder.

For securing the movable carrier 13 in its various positions of adjustment, the base 10 may be provided with a plurality of longitudinally extending parallel undercut grooves 15, the undercut portion 16 of the grooves being provided with a plurality of spaced protuberances shown in the present instance as parallel corrugations 17 extending transversely with respect to the undercut portion 16 of the grooves formed in the base. Movably mounted in the grooves 15 are blocks 18 having their upper surfaces provided with corrugations 19 adapted to engage and cooperate with the corrugations 17 on the undercut portions 16 of the grooves in a manner to resist movement of the blocks 18 longitudinally of the grooves. The blocks 18 are also provided with screw-threaded apertures 20 adapted to receive the screw-threaded portions of bolts 21 positioned in apertures 22 formed in the carrier 13, by which the corrugated surface of the blocks 18 may be drawn snugly into engagement, and into cooperative relationship with the corrugated surface of the undercut portion 16 in a manner to resist any movement of the carrier 13 longitudinally of the base 10.

The carriers 12 and 13 are provided with work supporting ribs 23 and 24, respectively, for supporting a piece of work thereon in the manner illustrated at 25 in Fig. 2.

For positioning one or both edges of the work 25 with respect to the supporting ribs 23 and 24 of the carriers 12 and 13, and with reference to the base 10, a plurality of vertically movable work elevating members 26, 27 and 28 are slidably mounted in vertically disposed apertures 29 formed in the carriers, the member 26, in the present instance, being mounted in the carrier 12 and the members 27 and 28 being mounted in the carrier 13. These elevating members, as clearly shown in Figs. 2 and 9, are provided with recesses 30 having inclined cam surfaces 31 adapted to be engaged by tapered inclined annular surfaces 32 formed on the end portions of screw members 33, 34 and 35 rotatably mounted in the carriers and longitudinally movable with respect thereto in a manner to engage the inclined cam surfaces 31 and move the elevating members against the adjacent lower edge of the work to position it vertically with respect to the ribs 23 and 24 as desired.

It will be observed that by such an arrangement, the piece of work, such as 25, may be adjusted bodily, or by manipulating either the member 33 or the members 34 and 35, one or the other edge of the work 25 may be moved upwardly as desired.

The carriers 12 and 13 are provided, preferably adjacent their central portion, with recesses 36, the oppositely disposed walls of which are inclined at an angle with respect to each other as clearly shown in Figs. 1, 2, 3, 8 and 9 of the drawings, and positioned within the recesses 36 of the carriers 12 and 13 are work-engaging members 37 and 38, respectively, having work-engaging portions 39 of V-shaped cross section formed on one edge thereof and adapted to bite into the work when the members 37 and 38 are moved into engagement therewith.

For moving the work-engaging member 37 transversely and into engagement with a piece of work, a plurality of adjusting screws 40 are mounted in the carrier 12 in spaced relation with respect to each other and longitudinally of the member 37 in a manner to engage the upper inner edge 40a, or the edge opposite the work-engaging edge 39 of the member 37 for moving the member laterally within the recess. It will be noted that by such an arrangement, the member 37 may be positioned at an angle with respect to the work holder, as indicated by dotted lines in Fig. 3, merely by adjusting one of the screws 40 inwardly more than the other, thus permitting the work engaging edge 39 of the member 37 to contact the work throughout its length where it is desired to position the work at an angle with respect to the holder, or where one side of the work may have an inclined surface.

For moving the work-engaging member 38 into holding engagement with the work, an adjusting or clamping screw 41 is screw-threaded into the carrier 13 in such a manner that its inner end engages the inner edge 40a of the member 38 adjacent its upper face and in a manner to force the work-engaging edge 39 into holding engagement with the work. It will be noted that by providing a single adjusting screw in the carrier 13, the work-engaging member 38 may adapt itself angularly to the adjacent side, or edge of the work it engages, depending upon the position of the work with respect to the work holder.

The adjusting screw 41, in the present instance, is provided with a pawl and ratchet mechanism illustrated in Figs. 1, 2 and 6, and by reference to Fig. 6, it will be noted that in the present arrangement, a ratchet 42 is formed integrally with the screw 41, and rotatably mounted upon an arcuate portion of the screw member 41 are plates 43 and 44, between which is rigidly secured, by means of rivets or bolts 45, a handle or lever 46. Pivotally mounted on a pivot pin 47 and between the plates 43 and 44 is a double ended pawl 48 having points 49 and 50 adapted to engage the teeth of the ratchet 42 in a manner to rotate the adjusting screw 41 in one direction or another, depending upon which of the points is in a position to engage the teeth of the ratchet.

For yieldingly securing one or the other of the points 49 or 50 in position to operatively engage the ratchet 42, the pawl 48 is provided, adjacent its central portion, with a positioning lobe 51 adapted to be engaged on one side or the other by a plunger 52 slidably mounted in a bore 53 formed in the lever 46, and adapted to be urged outwardly by means of a spring 54 in a manner to engage one or the other side of the lobe 51 of the pawl 48 for yieldingly holding one or the other of the points 49 or 50 in operative position with respect to the ratchet 42.

It will be observed that by such an arrangement, the adjusting screw 41 may be quickly and readily moved longitudinally in a manner to cause the work-engaging edge of the member 38 to impinge the adjacent face of a piece of work for securing the work in desired position, or to permit the member to be moved away from the work to release the work from the holder, depending upon which of the points 49 or 50 of the pawl 48 is in engagement with the teeth of the ratchet 42.

For moving the work engaging members 37 and 38 away from work engaging position when the force exerted by the adjusting screws 40 and 41 is relieved, the members 37 and 38 are provided with tension springs 55 having one of their end portions secured to the members by means of staples 56, or the like, and adapted to extend through apertures 57 formed in the carriers 12 and 13, the outer ends of the springs being connected to bars 58 adapted to span the apertures 57 and bear against the outer faces of the carriers 12 and 13, thereby tending, at all times, to hold the members 37 and 38 yieldingly in contact with their respective adjusting or clamping screws.

It will be noted by reference to Figs. 3 that one spring 55 is provided, adjacent the central portion of the member 37 to provide for proper engagement of the member 37 with the adjusting screws 40 as the screws are manipulated to position the work-engaging member 37 angularly with respect to the work holder.

It will be noted by reference to Figs. 2 and 8 that the opening at the mouth of the recesses 36 is of just sufficient dimension to permit of positioning the members 37 and 38 within the recesses, thus providing fulcrums for the members adjacent the work-engaging edge thereof, it being apparent that the inner edges 40a of the work-engaging members 37 and 38 within the recesses may be moved upwardly and downwardly about their respective fulcrums due to the enlargement of the recesses at their base or closed portion. It will be noted also that the inner edges 40a of the members 37 and 38 are inclined at an angle to the faces of the members, thus forming an obtuse angle at the inner lower edge of the members, and an acute angle at the upper inner edge of the members, the upper inner edges being positioned in a plane above the pivotal center of the fulcrums and in a manner to be engaged by the ends of the adjusting screws 40 and 41. It will be observed that by such an arrangement, after the work-engaging edges of the members 37 and 38 have been positioned against the sides of a piece of work, further movement of the adjusting screws 40 and 41 in a plane above the fulcrums serves to move the members 37 and 38 about their respective fulcrums in a manner to move the work-engaging edges 39 downwardly, thereby forcing the work snugly against the work supporting ribs 23 and 24, or against the work-elevating members 26, 27 and 28 as the case may be.

To maintain the upper faces of the work-engaging members 37 and 38 in spaced relation with respect to the upper sides of the recesses 36 while the work-engaging members are being moved into contact with the work, the members 37 and 38 are each provided with anti-friction balls 59 positioned in apertures 60 formed in the members and adapted to protrude a distance above the upper face of the members 37 and 38 in a manner to yieldingly engage the adjacent upper sides of the recesses 36.

To yieldingly urge the balls 59 outwardly, a compression spring 61 may be positioned within the aperture 60 in a manner to engage the lower or inner face of the balls, and the spring may be secured within the aperture 60 by a keeper 62 suitably positioned and secured within the lower end of the aperture.

To prevent displacement of the balls 59 from the apertures 60 when the work-engaging members 37 and 38 are removed from the carriers 12 and 13, the upper face of the members 37 and 38 adjacent the upper end of the aperture 60 may be peened over as indicated at 63 in Fig. 10, thereby providing a shoulder against which the ball 60 may be yieldingly urged by the spring 61.

It will be observed from the foregoing description that the upper face of the members 37 and 38 will be yieldingly retained in spaced relation to the upper sides of the recesses 36 until the edges 39 are moved into contact with the work by the adjusting screws 40 and 41, and that thereafter, any further movement of the adjusting screws will move the adjacent or inner edges 40a of the members 37 and 38 upwardly about their fulcrums, force the balls 59 into their respective apertures 60 against the action of the springs 61, and cause the edges 39 of the work-engaging members 37 and 38 to tightly impinge upon the work and, by reason of the upward movement of the inner edges 40a of the members 37 and 38, cause a downward movement of the edges 39, thus forcing the work snugly into engagement with the work supporting ribs 23 and 24, or the work-elevating members 26, 27 and 28, as the case may be.

It will be observed also that with the work secured in position in the manner above described, that any tendency of the work to lift from its supporting surfaces by the action of the tools employed, will, by reason of the relative position of the fulcrums and the points of contact between the inner edges 40a of the members 37 and 38 and the ends of the adjusting screws 40 and 41, act to move the work-engaging members toward the work and thereby exert a greater impinging action between the work-engaging edges 39 of the members and the work, to more securely hold the work against accidental displacement. In other words, it will be noted, by reference to Fig. 2, that any action which will cause a downward movement of the edge 40a of the members 37 and 38 within the recesses, will cause the members to move toward each other and in so doing, to more snugly engage the work.

In the event that it should be undesirable or impossible to secure a piece of work in the holder by means of the work-engaging member 37, a filler block 64 (Figs. 9 and 10) may be provided along the inner side of carrier 12 and secured thereto by means of bolts 65, one of which is shown in Fig. 10 as screw-threaded into the filler block and positioned in an aperture 66, one of which may be formed adjacent each end of the carrier 12, thereby providing a flat surface against which the work may be secured. To provide clearance for the work-engaging edge 39 of the member 37, the block 64 may be cut away to provide a recess 67 into which the edge 39 may project as illustrated in Fig. 9.

In Fig. 11 is illustrated a pair of work-engaging members 37a and 38a which, if found desirable, may be employed in place of the members 37 and 38. The work engaging edge of the members 37a and 38a are provided with parallel inclined teeth 68 and 69, respectively, the teeth of one of the members, when the members are in work-engaging position, being inclined in a direction opposed to the teeth of the other member, thereby providing suitable gripping surfaces for engagement with a piece of work. If desired, the members 37a and 38a may be provided with spring pressed anti-friction balls 59a adapted to function in the manner above described with reference to the anti-friction balls 59 positioned in the members 37 and 38.

It will be observed from the foregoing description that the present invention provides a device having novel means for securing the movable carrier against displacement with respect to the base, and wherein suitable means are provided for positioning the work with respect to the base or supporting surface. Furthermore, that the present invention provides for suitable angular adjustment of the work engaging members with respect to the work holder, and that suitable means are provided for readily and quickly positioning the work-engaging members with respect to the work.

It will be observed also that the present invention provides a novel construction and arrangement of the work-engaging members and their adjusting means whereby any tendency of the work to lift or be displaced from its supporting surface acts in a manner to more positively and effectually secure the work within the holder.

Obviously, the present invention is not limited to the precise construction and arrangement shown and described, as the same may be variously modified. Moreover, all the features of the invention need not be used conjointly as the same may be used to advantage in variously different combinations and subcombinations.

Having thus described my invention, what I claim and desire to secure by Letters Patent is:

1. In a work holder, the combination of a base, a plurality of carriers mounted thereon, a work engaging member having upper and lower faces movably mounted in one of said carriers and engageable therewith at said upper and lower faces adjacent the work engaging edge of said member in a manner to provide a horizontally disposed fulcrum for said member adjacent the work engaging edge thereof, and a screw having its end portion engageable with the opposite edge of said member in a plane above said fulcrum and in a manner to move said member laterally and the work engaging edge thereof downwardly about said fulcrum.

2. In a work holder, the combination of a base, a plurality of carriers having recesses formed therein mounted on said base, the oppositely disposed walls of said recesses being inclined at an angle with respect to the other, work engaging members movably mounted in said recesses and engageable with said carriers adjacent the open side of the recesses, means for positioning one of said members angularly with respect to its carrier, and adjustable means for moving said member toward a piece of work positioned between said members.

3. In a work holder, the combination of a base, a plurality of carriers having recesses formed therein mounted on said base, the oppositely disposed walls of said recesses being inclined at an angle with respect to each other, work engaging members movably mounted in said recesses and engageable with said carriers adjacent the open side of the recesses and in a manner to form a fulcrum for said members adjacent the work engaging edges thereof, means for positioning one of said members angularly with respect to said carrier, and adjustable means engageable with the opposite edges of said members above said fulcrum for moving said members toward a piece of work and around said fulcrum in a manner to cause a downward movement of the work engaging edge of the member when said work engaging edge is forced against the work by said adjustable means.

4. In a work holder, the combination of a base, a plurality of carriers having recesses formed therein mounted on said base, the oppositely disposed walls of said recesses being inclined at an angle with respect to each other, work engaging members movably mounted in said recesses and engageable with said carriers adjacent the open side of the recesses and in a manner to form a fulcrum for said members adjacent the work engaging edges thereof, means for positioning one of said members angularly with respect to said carrier, adjustable means engageable with the opposite edges of said members above said fulcrum for moving said members toward a piece of work and around said fulcrum in a manner to cause a downward movement of the work engaging edge of the member when said work engaging edge is forced against the work by said adjustable means, and yielding means for holding said members in spaced relation with respect to one of the walls of said recesses while said members are being moved into engagement with a piece of work.

KASIMIR JANISZEWSKI.